(12) United States Patent
Leibovici et al.

(10) Patent No.: US 9,529,819 B2
(45) Date of Patent: Dec. 27, 2016

(54) OPENING UNSUPPORTED FILE TYPES THROUGH REMOTING SESSIONS

(71) Applicant: VMware, Inc., Palo Alto, CA (US)

(72) Inventors: Andre Leibovici, Mountain View, CA (US); Scott Howard Davis, Needham, MA (US)

(73) Assignee: VMware, Inc., Palo Alto, CA (US)

( * ) Notice: Subject to any disclaimer, the term of this patent is extended or adjusted under 35 U.S.C. 154(b) by 339 days.

(21) Appl. No.: 13/975,194

(22) Filed: Aug. 23, 2013

(65) Prior Publication Data

US 2015/0058286 A1 Feb. 26, 2015

(51) Int. Cl.
*G06F 17/30* (2006.01)
*G06F 9/50* (2006.01)

(52) U.S. Cl.
CPC ....... *G06F 17/30174* (2013.01); *G06F 9/5055* (2013.01)

(58) Field of Classification Search
CPC .......................... G06F 17/30174; G06F 9/5055
See application file for complete search history.

(56) References Cited

U.S. PATENT DOCUMENTS

| | | | | |
|---|---|---|---|---|
| 7,720,864 B1 * | 5/2010 | Muth | ................ | G06F 17/30171 707/707 |
| 8,037,476 B1 * | 10/2011 | Shavit | ..................... | G06F 9/526 711/150 |
| 8,291,414 B2 * | 10/2012 | Bansal | .................. | G06F 9/4881 718/1 |
| 2010/0070978 A1 * | 3/2010 | Chawla | .................. | G06F 9/5077 718/105 |
| 2011/0107409 A1 | 5/2011 | Wilkinson et al. | | |
| 2011/0113012 A1 * | 5/2011 | Gruhl | .................. | G06F 11/1451 707/646 |
| 2011/0184993 A1 | 7/2011 | Chawla et al. | | |
| 2011/0209064 A1 * | 8/2011 | Jorgensen | ............. | G06F 9/4445 715/733 |
| 2012/0303763 A1 | 11/2012 | Duggal | | |
| 2013/0018939 A1 | 1/2013 | Chawla et al. | | |
| 2013/0073703 A1 * | 3/2013 | Das | ........................ | H04L 67/10 709/223 |
| 2013/0318521 A1 * | 11/2013 | Monaghan | ............ | H04L 63/107 718/1 |

OTHER PUBLICATIONS

International Search Report and Written Opinion of the International Searching Authority PCT/2014/051877, dated Nov. 28, 2014, 12 pages.

* cited by examiner

*Primary Examiner* — Albert Phillips, III

(57) ABSTRACT

Viewing and editing operations on a file having an unsupported file type are enabled through a method of opening the file through a remoting session. The method includes the steps of issuing a request to open the file and metadata of the file, programmatically transmitting credentials of the user to a connection server to log the user into a virtual machine, and establishing a remoting session with the virtual machine to access the file for viewing and editing, the virtual machine opening the file based on the request to open the file and the metadata of the file.

19 Claims, 5 Drawing Sheets

OPENING UNSUPPORTED FILE TYPES THROUGH REMOTING SESSIONS

BACKGROUND

One of the challenges in keeping up with rapid advances in mobile computing technology has been to maintain compatibility between newer mobile devices, such as a smart phone or a tablet computer, and applications that are not practical to be installed on the mobile devices. Some examples of such software applications are special purpose applications, such as photo editing software and diagramming software. In general, these software applications are too large and consume too much of the storage and memory resources of the mobile devices to be practically deployed in them. In newer mobile devices, storage and memory resources may be less scarce, but the limitation in such cases is not so much in hardware but in the cost of the software license. As a consequence, in order to view or edit a document that is not supported by the mobile device, the mobile device user has to carry out the cumbersome steps for converting the document or remotely accessing a different system that supports the file type of the document. In both cases, the additional steps lead to loss in user productivity and increased user frustration.

SUMMARY

One or more embodiments provide techniques for seamlessly opening a file in a computing device for viewing and editing, even though the computing device may not have applications installed therein to support the file type. According to the embodiments, the viewing and editing operations on files of unsupported file types are enabled seamlessly through virtual desktop or application sessions.

According to one embodiment, a method of opening a file using a computing device, where the file is of a type that is not supported by any application installed in the computing device, includes the steps of receiving from a user logged into the computing device an indication that the user would like to open the file, issuing a request to open the file and metadata of the file, programmatically transmitting credentials of the user to a connection server to log the user into a virtual machine, and establishing a remoting session with the virtual machine to access the file for viewing and editing, the virtual machine opening the file based on the request to open the file and the metadata of the file.

According to another embodiment, a method of opening a file using a computing device, where the file is of a type that is not supported by any application installed in the computing device, includes the steps of receiving from a user logged into the computing device an indication that the user would like to open the file, issuing a request to open the file and metadata of the file, automatically selecting a virtual machine that has an application installed therein that can open the file, programmatically transmitting credentials of the user to a management server to log the user into the selected virtual machine, and establishing a remoting session with the virtual machine to access the file for viewing and editing, the virtual machine opening the file based on the request to open the file and the metadata of the file.

A method of supporting a remoting session through a virtual machine, according to an embodiment, includes the steps of, synchronously with a successful login to the virtual machine, reading a request to open a file and metadata of the file from a predetermined storage location, launching an application with which the file can be opened, opening the file within the application, and generating a display of the file that is opened inside the application and transmitting the display to a remote computing device.

Further embodiments include a non-transitory computer readable storage medium that includes instructions that enable a processing unit to implement one or more aspects of the above methods, as well as a computer system configured to implement one or more aspects of the above methods.

DETAILED DESCRIPTION

Figure 1:
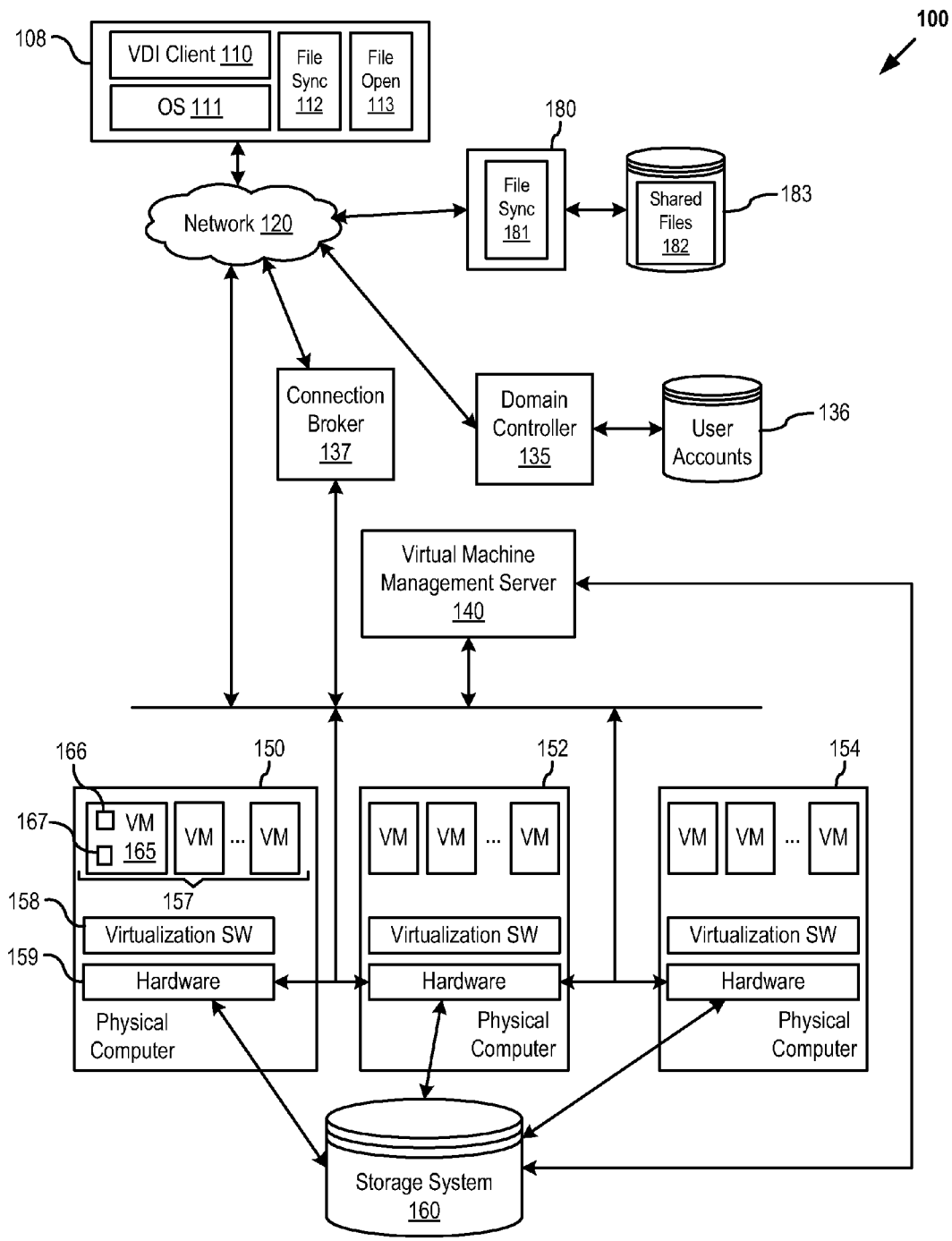
FIG. 1 illustrates components of a virtualized desktop infrastructure system in which one or more embodiments may be implemented.

FIG. 1 illustrates components of a virtualized desktop infrastructure (VDI) system 100 in which one or more embodiments may be implemented. In VDI system 100, VDI client software programs (also referred to as "VDI clients" for short), e.g., VDI client 110, run on operating systems of local computing devices, e.g., client machine 108 on top of an operating system (OS) 111. Client machine 108 may be a smart phone, a tablet computer, a notebook computer, or any other type of computing device having conventional components such as one or more central processing units, memory, local storage, network interface cards, input devices such as a keyboard, mouse, touch screen, and microphone, and output devices such as a display and speakers. For simplicity, only one client machine 108 is shown in FIG. 1, but it should be understood that VDI system 100 supports different types of client machines 108 and in large numbers. VDI clients provide an interface for the users to access their desktops or certain applications, which may be running in one of virtual machines 157 or blade server (not shown) in a data center that is remote from the user locations. With VDI clients, users can access desktops or applications running in a remote data center through network 120, from any location, using a general purpose computer running a commodity operating system and a VDI client software program, or a special purpose thin client such as those available from Dell, HP, NEC, Sun Microsystems, Wyse, and others.

VDI system 100 includes a domain controller 135, such as Microsoft Active Directory®, that manages user accounts 136 including user log-in information, and a connection broker 137 that manages connections between VDI clients and desktops running in virtual machines 157 or other platforms. Domain controller 135 and connection broker 137 may run on separate servers or in separate virtual machines running on the same server or different servers. In the embodiments illustrated herein, desktops and applications are running in virtual machines 157 and virtual machines 157 are instantiated on a plurality of physical computers 150, 152, 154, each of which includes virtualization software 158 and hardware 159, is controlled by a virtual machine management server 140, and is coupled to a shared persistent storage system 160. As used herein, a "connection broker" is any apparatus that is configured to manage connections to remote user sessions such as remote desktops, and a "domain controller" is any apparatus that is configured to have access to and manage user log-in information.

All of the components of VDI system 100 communicate via network 120. For simplicity, a single network is shown but it should be recognized that, in actual implementations, the components of VDI system 100 may be connected over the same network or different networks. Furthermore, a particular configuration of the virtualized desktop infrastructure is described above and illustrated in FIG. 1, but it should be recognized that one or more embodiments of the present invention may be practiced with other configurations of the virtualized desktop infrastructure.

Client machine 108 has a file synchronization (sync) engine 112 implemented therein. File sync engine 112 communicates with a file sync server 180, in particular with a file sync agent 181, to synchronize the contents of shared files 182, which are persistently stored in storage unit 183 of file sync server 180, between client machine 108 and file sync server 180. In the embodiment illustrated herein, virtual machine 157 also has a file sync engine 166 implemented therein. If the same user is logged into client machine 108 and virtual machine 157, file sync engine 112 in client machine 108 and file sync engine 166 in virtual machine 157 would communicate with file sync agent 181 to synchronize the contents of shared files 182 across client machine 108 and virtual machine 157. As a result of the synchronization, any persistent updates to shared files 182, whether made by client machine 108 or by virtual machine 157 (or any client machine that the user logs into with the same user credentials), will be persistently stored in storage unit 183 and the other machine(s). Other known file synchronization techniques may be employed in the embodiments, including the one disclosed in U.S. patent application Ser. No. 13/784,551, entitled "Cross-File Differential Content Synchronization" and filed on Mar. 4, 2013, the entire contents of which are incorporated by reference herein.

According to the embodiments, client machine 108 includes a file open engine 109. File open engine 109 enables files that have file extensions not supported by any application installed in client machine 108 to be viewable and editable using client machine 108 through a virtual desktop or application session (also referred to herein as a "remoting session") that is launched in client machine 108. File open engine 109 is implemented in software and details thereof are further described below. Further, according to embodiments, virtual machine 157 includes a file open agent 167 that automatically launches an application and a file within the application when the user who has submitted a request to open a file for viewing and editing through the remoting session, has logged into virtual machine 157.

In other embodiments, the virtual machine that the user is logging into may not have a file sync engine 166. In such cases, file open agent 167 automatically communicates with shared files 182 to verify if there any files to be opened and copies any such files into the virtual machine prior to launching the application and the file within the application.

Figure 2A:
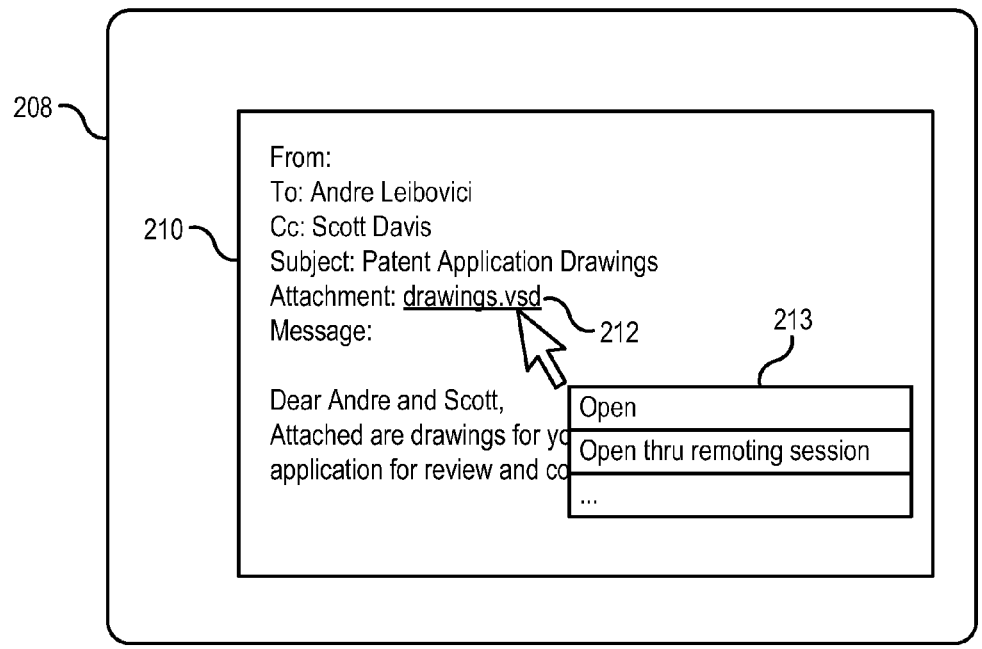
FIGS. 2A and 2B illustrate two different examples of how a request to open a file according to embodiments may be initiated.
Figure 2B:
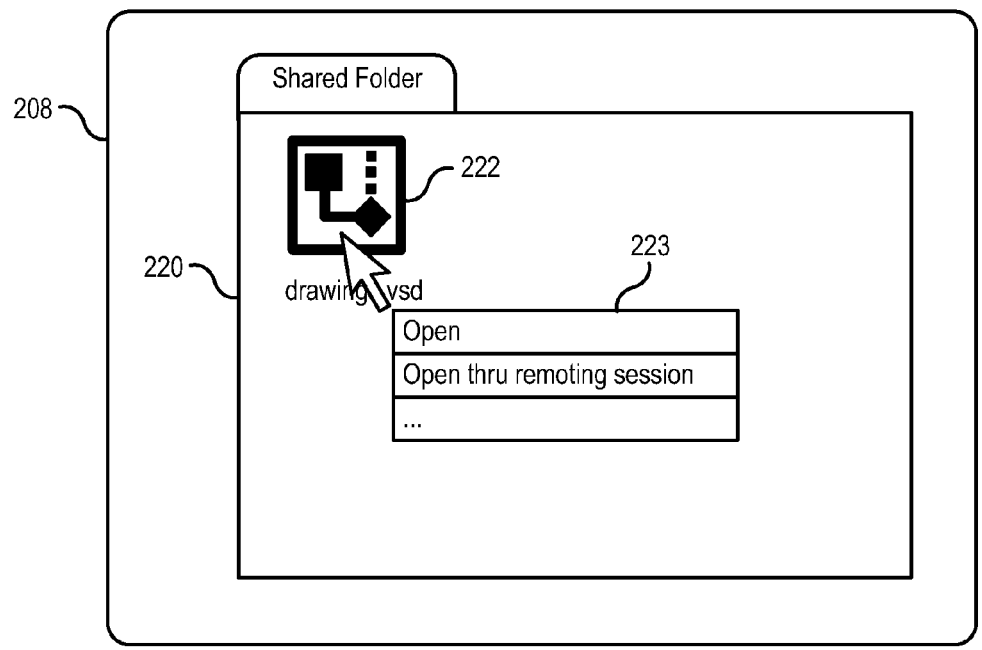

FIGS. 2A and 2B illustrate two different examples of how a request to open a file according to embodiments may be initiated. In both examples, client machine 108 is a tablet computer and a display 208 of the tablet computer is shown in each of FIGS. 2A and 2B.

In FIG. 2A, a user has launched an email client in the tablet computer and is viewing an email 210. Email 210 includes an attachment 212 and the attached file has a file extension ".vsd" which is the extension for Microsoft Visio® files. This example is used herein because the Microsoft Visio® application is typically not installed in tablet computers and smart phones. As a way to enable users of computing devices that do not support files of certain types, embodiments implement a file open engine 109 that give the user an option to open the file for viewing and editing through a remoting session. In the example illustrated herein, a file open engine 109 is implemented in the tablet computer and the user of the tablet computer is given the option to open the file for viewing and editing through a remoting session. The option is displayed through a context menu 213, which may be brought up according to any technically feasible method, currently known or future developed (e.g., a mouse right click or a touch screen input equivalent to a mouse right click). When this option is selected, file open engine 109 carries out the method of FIG. 4.

In FIG. 2B, a user has opened a shared folder 220, the contents of which are synchronized in the same manner as shared files 182 described above. Shared folder 220 includes a file 222 which has the extension ".vsd" that may not be supported by the underlying computing device, which in the embodiment illustrated herein is the tablet computer. As a way to enable the user of the tablet computer to open such a file for viewing and editing, a file open engine 109 is implemented in the tablet computer and the user is given an option to open the file for viewing and editing through a remoting session. The option is displayed through a context menu 223, which may be brought up according to any technically feasible method, currently known or future developed (e.g., a mouse right click or a touch screen input equivalent to a mouse right click). When this option is selected, file open engine 109 carries out the method of FIG. 4.

In addition to selecting options through context menu 213 or 223, a user may set default file open options for different types of files. For example, the user may designate all Microsoft Visio® files to be opened through a remoting session, but all Microsoft Word® and Microsoft Excel® files to be opened locally. In addition, enterprises may mandate all of its users to open files supported by expensive applications through a remoting session so that the number of license seat purchases can be reduced.

Figure 3A:
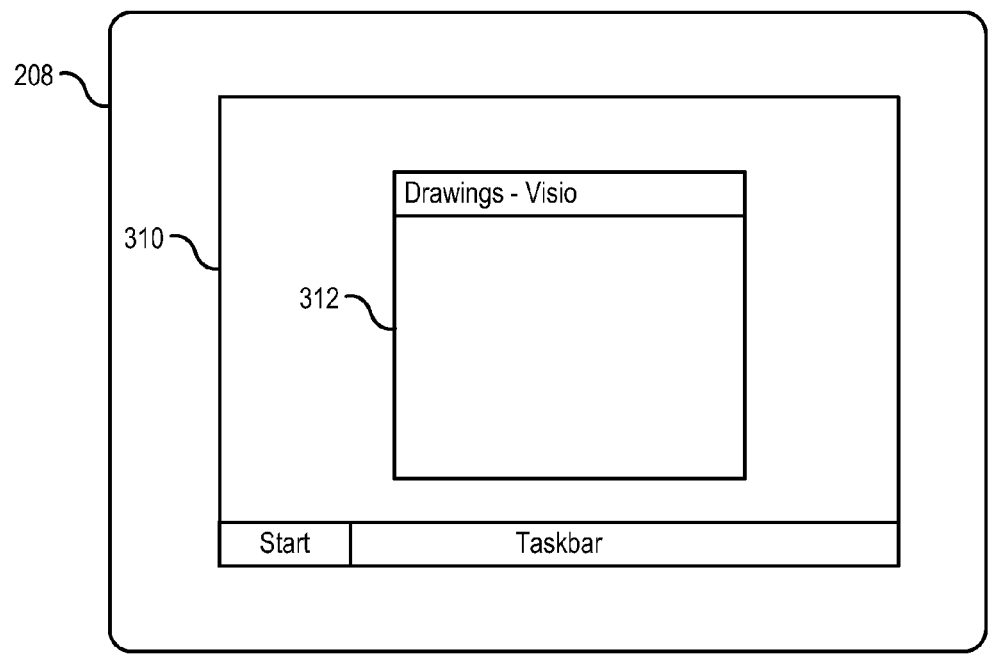
FIGS. 3A and 3B illustrates two example displays of a remoting session launched in accordance with embodiments.
Figure 3B:
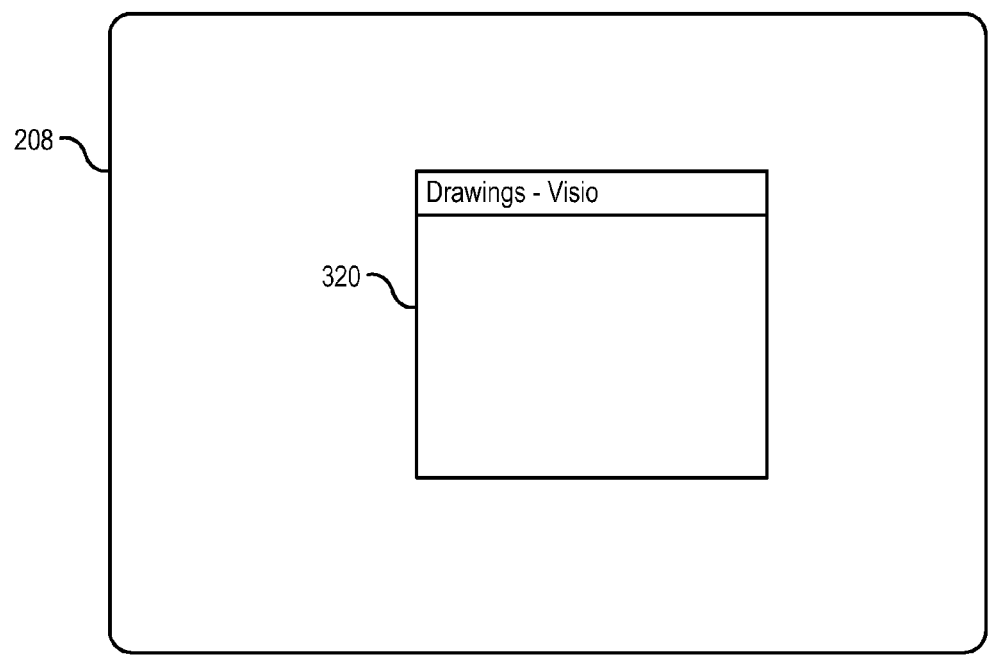

The remoting session that is launched by file open engine 109 may be a remote desktop session or a remote application session. FIG. 3A illustrates a remote desktop session launched in the tablet computer and display 208 of the tablet computer shows a virtual desktop 310 and an application 312 launched within virtual desktop 310. FIG. 3B illustrates a remote application session launched in the tablet computer and display 208 of the tablet computer shows an application 320 without any virtual desktop. In both cases, a file that is requested to be opened is opened within the application environment, e.g., within application 312 or application 320.

Figure 4:
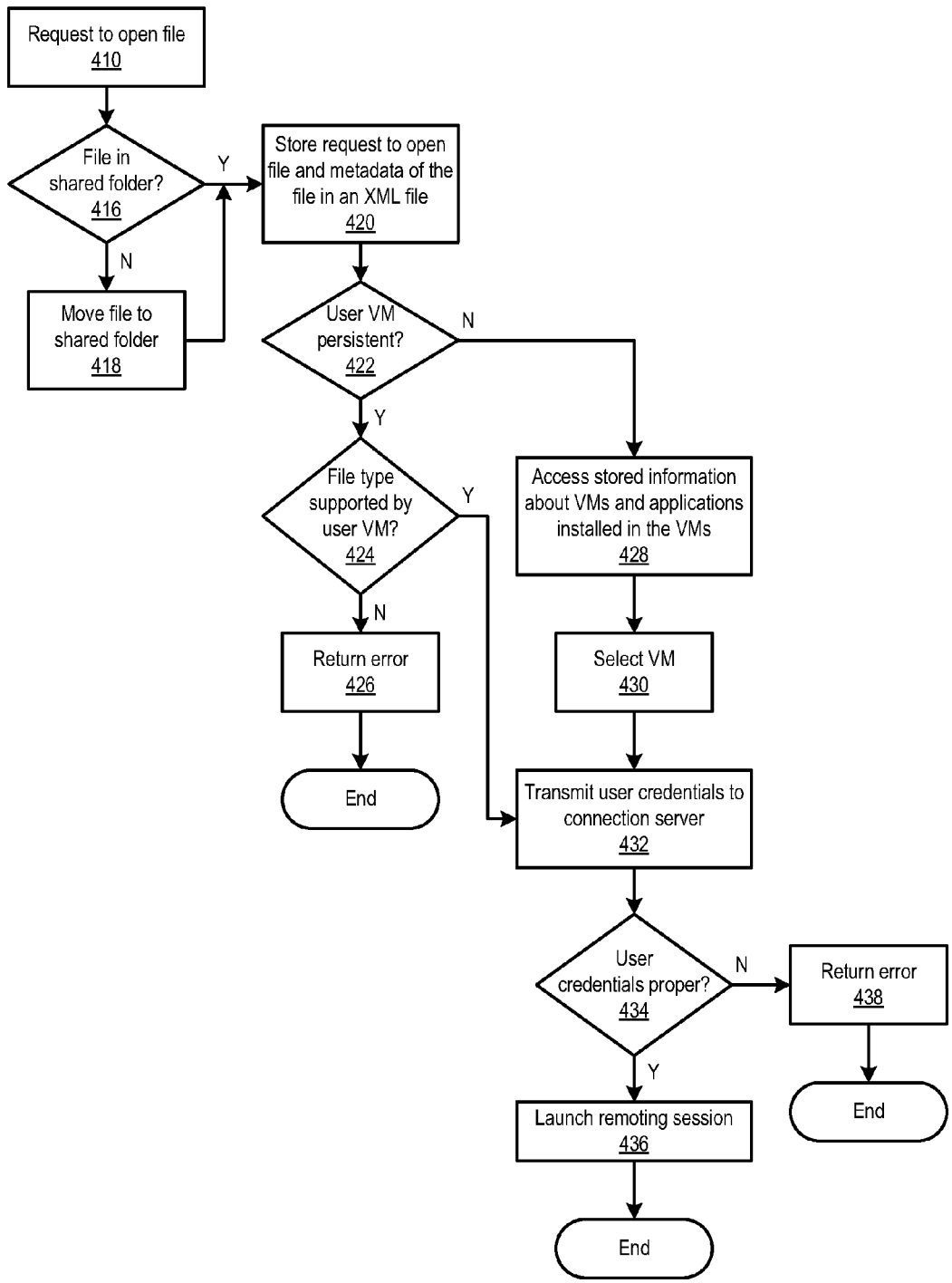
FIG. 4 illustrates steps of a method executed by a client machine in response to a request to open a file through a remoting session.

FIG. 4 illustrates steps of a method executed by file open engine 109 of client machine 108 in response to a request to open a file through a remoting session. The method begins at step 410, where file open engine 109 receives the request to open a file through a remoting session (e.g., when a user selects the option to do so through context menu 213 or 223).

Then, at step 412, file open engine 109 determines if the file is in a shared sync folder such as shared folder 220 whose contents are automatically synchronized across all devices of the user through file sync server 180, or not such as file 212. If file open engine 109 determines the file is not in a shared sync folder, the file is moved or copied into a shared sync folder at step 418 before executing step 420. Otherwise, step 418 is skipped.

At step 420, the request to open the file is stored in a shared file (e.g., as an XML file within a shared hidden sync folder) along with metadata of the file. The metadata of the file includes the file name, file path, file size, and the file creation time stamp. As described in further detail below, this information is used by file open agent 167 running inside a virtual machine when opening the file within an application launched in the virtual machine that is remotely accessed by client machine 108 for viewing and editing.

At step 422, file open engine 109 determines whether or not the user who is logged into client machine 108, has been allocated a persistent or a non-persistent virtual machine. A "persistent" virtual machine, as used herein, means a particular virtual machine allocated to a user that persistently maintains the user's preferences and applications installed therein. In the case a persistent virtual machine has been allocated to the user, file open engine 109 determines at step 424 if the virtual machine of the user has an application installed therein that can open the file for viewing or editing. The determination may be made through a shared file (e.g., an XML file within the shared hidden sync folder) that is updated by the virtual machine of the user as to the applications that are installed therein. If there is no application installed in the virtual machine of the user that can open the file for viewing or editing, an error message is returned at step 426 and the process ends. On the other hand, if there is an application installed in the virtual machine of the user that can open the file for viewing or editing, step 432, which is explained below, is executed.

If the user logged into client machine 108 has been allocated a non-persistent virtual machine, information stored, e.g., in an XML file within the shared hidden sync folder, about a pool of virtual machines is accessed and analyzed at step 428 for possible selection as the user's virtual machine. Then, at step 430, the virtual machine to host the user's virtual desktop or application session is selected. The selection is made among virtual machines that have an application installed therein that can open the file for viewing or editing. Upon selection of the virtual machine, step 432 is executed.

At step 432, file open engine 109 transmits user credentials to connection broker 137 as part of a single sign-on method that is described in detail in U.S. patent application Ser. No. 12/939,817, entitled "Single Sign On For a Remote User Session" and filed on Nov. 4, 2010, the entire contents of which are incorporated by reference herein. Connection broker 137 determines whether or not the user credentials are proper and file open engine 109 proceeds according to the determination at step 434. If the user credentials are determined to be proper, the user is logged into the virtual machine, which is either the user's persistent virtual machine or the one selected at step 430, and file open engine 109 launches a virtual desktop or application client in client machine 108 to establish a remoting session with the virtual machine to display the file that has been opened for viewing and editing by the virtual machine (step 436). It should be understood that the steps shown in FIG. 4, following the open file request at step 410, are executed programmatically without any additional inputs from the user. As a result, the user will be able to seamlessly open a file for viewing and editing even though the file may be of a type that is not supported by any of the applications installed in the user's computing device.

If, at step 434, the user credentials are not determined to be proper, an error message is returned at step 438 and the process ends.

Figure 5:
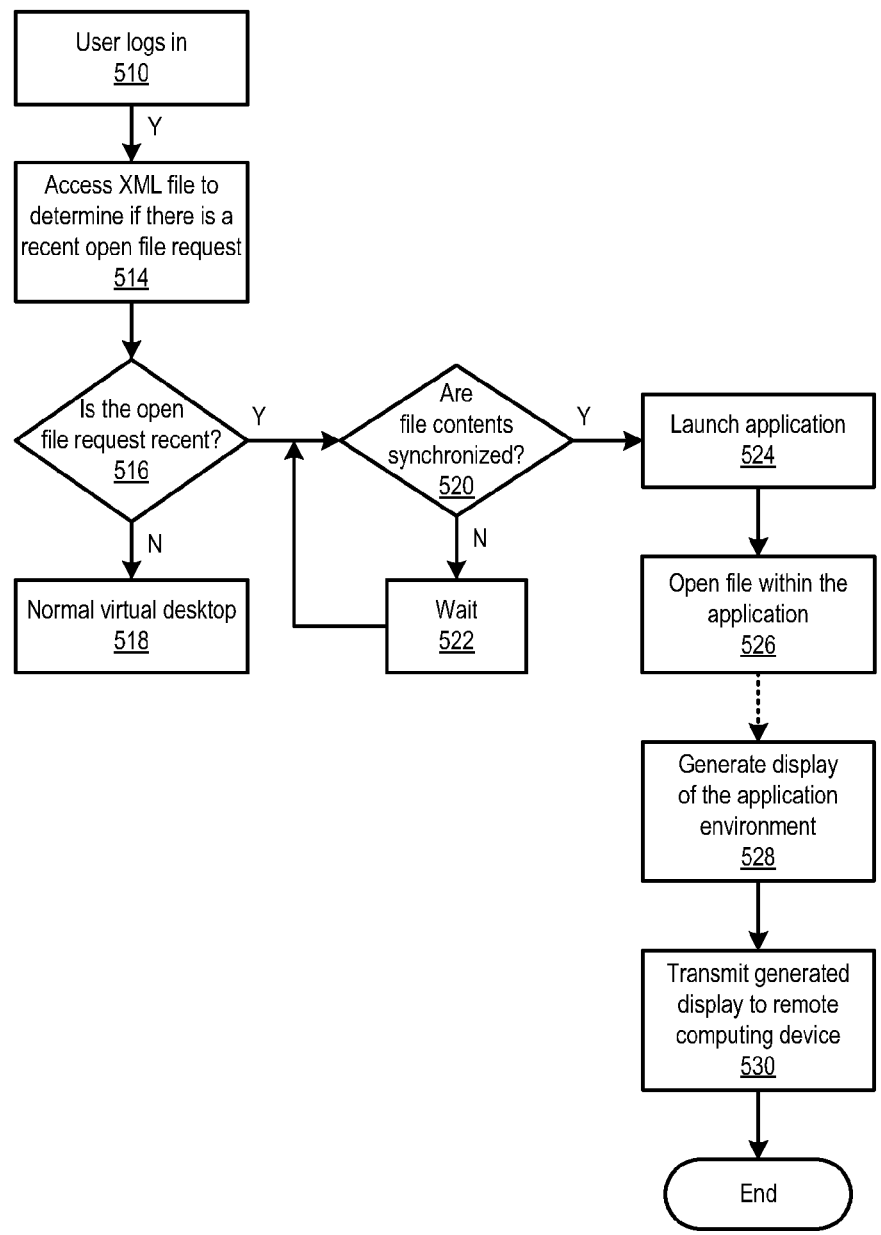
FIG. 5 illustrates steps of a method executed by a virtual machine to support the request from the client machine to open a file through a remoting session.

FIG. 5 illustrates steps of a method executed by file open agent 167 of virtual machine 165 in response to a user login. The user login at step 510 triggers file open agent 167 to carry out the remaining steps. At step 514, file open agent 167 accesses the shared file created by the user (e.g., the XML file created at step 420 described above) and examines the shared file to see if there is a "recent" open file request. Because embodiments aim to provide a seamless file opening process to the user through a remoting session, open file agent 167 ignores requests that are older than 1 minute. The amount of time may be customized according to environment requirements. If, at step 516, file open agent 167 determines that the open file request is too old, a virtual desktop is launched in the customary manner (step 518). On the other hand, if there is a recent open file request, step 520 is executed. In one embodiment, the determination as to whether or not open file request is too old is made by examining the file creation time stamp and comparing it to the current time.

At step 520, file open agent 167 examines the file metadata that is stored with the open file request to identify the file name and the file location of the file that is subject to the open file request, and determines whether contents of that file stored in the virtual machine is in sync (i.e., all persistent updates made to the file is persistently stored in the virtual machine). If not, file open agent 167 waits for a period of time at step 522 and checks again. Once the file in the virtual machine is synchronized, file open agent 167, at step 524, launches the application within which the file can be opened for viewing and editing. In the example where the file is a Microsoft Visio® file, the Microsoft Visio® application is launched at step 524. After the application has been launched, file open agent 167 opens the file within the application at step 526.

The dotted arrow between steps 526 and 528 signifies a transition of control between file open agent 167 and a remoting server process running in the virtual machine. Steps 528 and 530 are carried out by the remoting server process. At step 528, the display of the application environment that is to be transmitted to client machine 108 is generated. As discussed above in conjunction with FIGS. 3A and 3B, this display may or may not include a virtual desktop display. If a remote desktop session is launched in client machine 108, the display is generated to include the virtual desktop display. If, on the other hand, a remote application session is launched in client machine 108, the display is generated without the virtual desktop display. At step 530, the generated display is transmitted to client machine 108.

In the embodiments where the virtual machine that the user logged into does not have a file sync engine 166, file open agent 167 at step 514 automatically communicates with storage unit 183 of file sync server 180 to access the XML file created at step 420 described above, to verify if there is a "recent" open file request according to step 516. Then, at step 520, file open agent 167 examines the file metadata that is stored with the open file request to identify the file name and the file location of the file that is subject to the open file request, and then, prior to proceeding to step 524, copies the contents of this file into the virtual machine.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of opening a file using a computing device, the file being of a type that is not supported by any application installed in the computing device, comprising:
    receiving from a user logged into the computing device an indication that the user would like to open a file;
    issuing a request to open the file and metadata of the file;
    determining whether the user has been allocated a persistent virtual machine that persistently maintains preferences and installed applications for the user or a non-persistent virtual machine;
    selecting the persistent virtual machine as a virtual machine to open the file and the metadata file responsive to determining that the user has been allocated the persistent virtual machine;
    selecting one of the non-persistent virtual machines as the virtual machine to open the file and the metadata file responsive to determining that the user has been allocated the non-persistent virtual machine;
    programmatically transmitting credentials of the user to a connection server to log the user into the virtual machine; and
    establishing a remoting session with the virtual machine to access the file for viewing and editing, the virtual machine opening the file based on the request to open the file and the metadata of the file.

2. The method of claim 1, wherein the file is stored in a folder that is accessible by any computing device and virtual machine that the user logs into, and contents of the folder are programmatically synchronized across one or more computing devices and virtual machines that the user is logged into.

3. The method of claim 1, further comprising:
    copying the file into a folder that is accessible by any computing device and virtual machine that the user logs into,
    wherein contents of the folder are programmatically synchronized across one or more computing devices and virtual machines that the user is logged into.

4. The method of claim 1, further comprising:
    checking if the file type is supported by the virtual machine of the user.

5. The method of claim 1, wherein selecting the non-persistent virtual machines as the virtual machine to open the file and the metadata file responsive to determining that the user has been allocated the non-persistent virtual machine, comprises:
    analyzing a file that includes information about a pool of virtual machines in order to select the virtual machine for opening the file.

6. The method of claim 1, wherein the virtual machine is automatically selected from a pool of virtual machines each having installed therein the application that supports the file type of the file to be opened.

7. The method of claim 1, wherein the request to open the file includes a time stamp, the request becoming invalid after a predetermined amount of time has elapsed from the time stamp, and the metadata of the file includes a file name and a file path.

8. The method of claim 1, wherein the remoting session is a remote desktop session.

9. The method of claim 1, wherein the remoting session is a remote application session.

10. The computing device of claim 9, wherein the file is stored in a folder that is accessible by any computing device and virtual machine that the user logs into, and contents of the folder are programmatically synchronized across one or more computing devices and virtual machines that the user is logged into.

11. The computing device of claim 9, wherein the instructions further cause the processor to:
copy the file into a folder that is accessible by any computing device and virtual machine that the user logs into,
wherein contents of the folder are programmatically synchronized across one or more computing devices and virtual machines that the user is logged into.

12. The computing device of claim 9, further comprising:
checking if the file type is supported by the virtual machine of the user.

13. The computing device of claim 9, wherein selects the non-persistent virtual machines as the virtual machine to open the file and the metadata file responsive to determining that the user has been allocated the non-persistent virtual machine, comprises:
analyze a file that includes information about a pool of virtual machines in order to select the virtual machine for opening the file.

14. The computing device of claim 9, wherein the virtual machine is automatically selected from a pool of virtual machines each having installed therein the application that supports the file type of the file to be opened.

15. The computing device of claim 9, wherein the request to open the file includes a time stamp, the request becoming invalid after a predetermined amount of time has elapsed from the time stamp, and the metadata of the file includes a file name and a file path.

16. The computing device of claim 9, wherein the remoting session is a remote desktop session.

17. The computing device of claim 9, wherein the remoting session is a remote application session.

18. A computing device for opening a file being of a type that is not supported by any application installed in the computing device, the computing device comprising:
a memory storing instructions; and
a processor that, upon executing the instructions:
receives from a user logged into the computing device an indication that the user would like to open a file;
issues a request to open the file and metadata of the file;
determines whether the user has been allocated a persistent virtual machine that persistently maintains preferences and installed applications for the user or a non-persistent virtual machine;
selects the persistent virtual machine as a virtual machine to open the file and the metadata file responsive to determining that the user has been allocated the persistent virtual machine;
selects one of the non-persistent virtual machines as the virtual machine to open the file and the metadata file responsive to determining that the user has been allocated the non-persistent virtual machine;
programmatically transmits credentials of the user to a connection server to log the user into the virtual machine; and
establishes a remoting session with the virtual machine to access the file for viewing and editing, the virtual machine opening the file based on the request to open the file and the metadata of the file.

19. A non-transitory computer-readable medium storing instructions that, when executed by a processor, cause the processor to perform a method of opening a file using a computing device, the file being of a type that is not supported by any application installed in the computing device, the method comprising:
receiving from a user logged into the computing device an indication that the user would like to open a file;
issuing a request to open the file and metadata of the file;
determining whether the user has been allocated a persistent virtual machine that persistently maintains preferences and installed applications for the user or a non-persistent virtual machine that is not assigned to the user prior to issuing the request to open the file and metadata file;
selecting the persistent virtual machine as a virtual machine to open the file and the metadata file responsive to determining that the user has been allocated the persistent virtual machine;
selecting one of the non-persistent virtual machines as the virtual machine to open the file and the metadata file responsive to determining that the user has been allocated the non-persistent virtual machine;
programmatically transmitting credentials of the user to a connection server to log the user into the virtual machine; and
establishing a remoting session with the virtual machine to access the file for viewing and editing, the virtual machine opening the file based on the request to open the file and the metadata of the file.

* * * * *